Dec. 29, 1970  J. D. SANTI  3,550,268
METHOD OF ASSEMBLING DRY REED SWITCHES
Filed April 24, 1969  4 Sheets-Sheet 1

INVENTOR
John D. Santi
By Ira Milton Jones
ATTORNEY

Dec. 29, 1970        J. D. SANTI        3,550,268
METHOD OF ASSEMBLING DRY REED SWITCHES
Filed April 24, 1969        4 Sheets-Sheet 2

INVENTOR
John D. Santi
By
ATTORNEY

Dec. 29, 1970  J. D. SANTI  3,550,268
METHOD OF ASSEMBLING DRY REED SWITCHES
Filed April 24, 1969  4 Sheets-Sheet 3
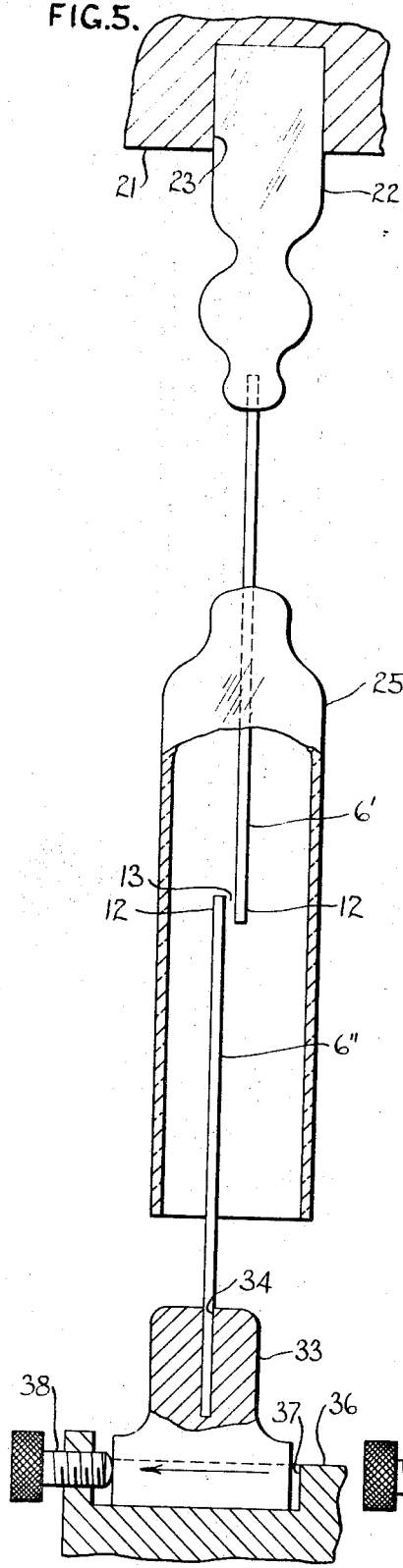
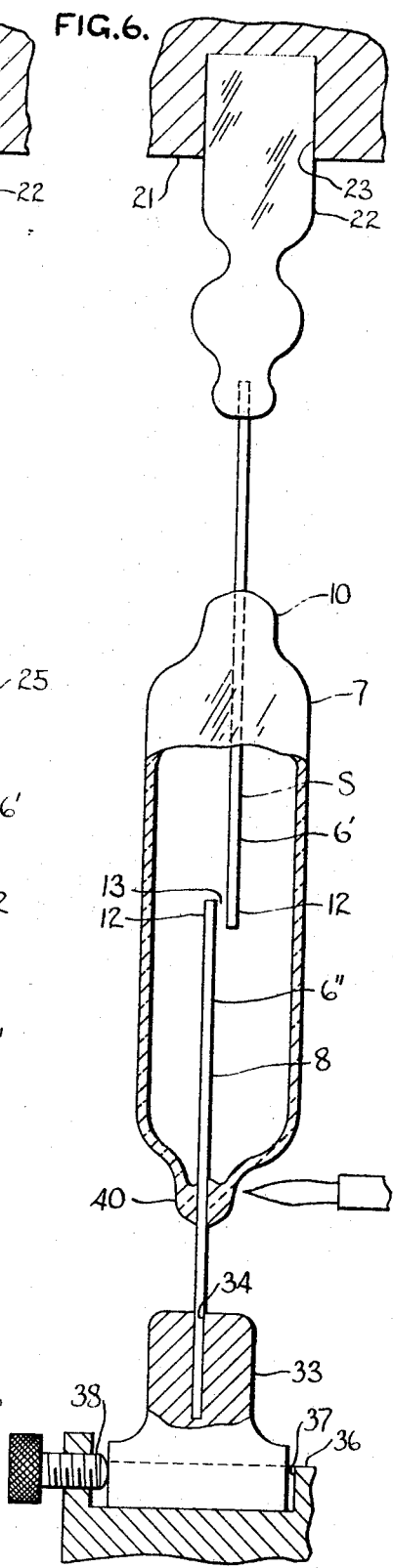
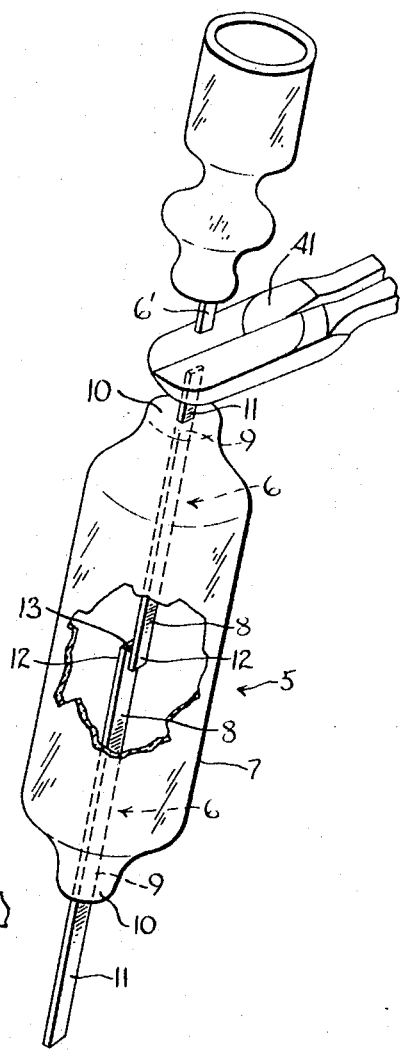
INVENTOR
John D. Santi
By [signature]
ATTORNEY United States Patent Office 3,550,268
Patented Dec. 29, 1970

3,550,268
METHOD OF ASSEMBLING DRY REED SWITCHES
John D. Santi, West Allis, Wis., assignor to Briggs & Stratton Corporation, Wauwatosa, Wis., a corporation of Delaware
Continuation-in-part of application Ser. No. 533,695, Mar. 11, 1966. This application Apr. 24, 1969, Ser. No. 818,914
Int. Cl. H01h 11/00
U.S. Cl. 29—622     5 Claims

ABSTRACT OF THE DISCLOSURE

One reed is held upright while a holder of glass is fused to its upper end and the upper end of a tubular glass envelope is fused around its middle. The holder, secured in a first fixture, then pendently supports the first reed and envelope. The other reed is moved into the envelope through its open bottom and is fixed with its tip portion overlappingly juxtaposed to that of the first, being supported at its bottom by a second fixture. The holder is then heated to melting to allow the tip portions of the reeds to mutually orient one another by engagement under influence of a magnetic field through them. When the holder hardens, the magnetic field is discontinued and one fixture is moved to establish an air gap between the reed tips. The bottom part of the envelope is then fused around the medial portion of the other reed.

---

Figure 1:
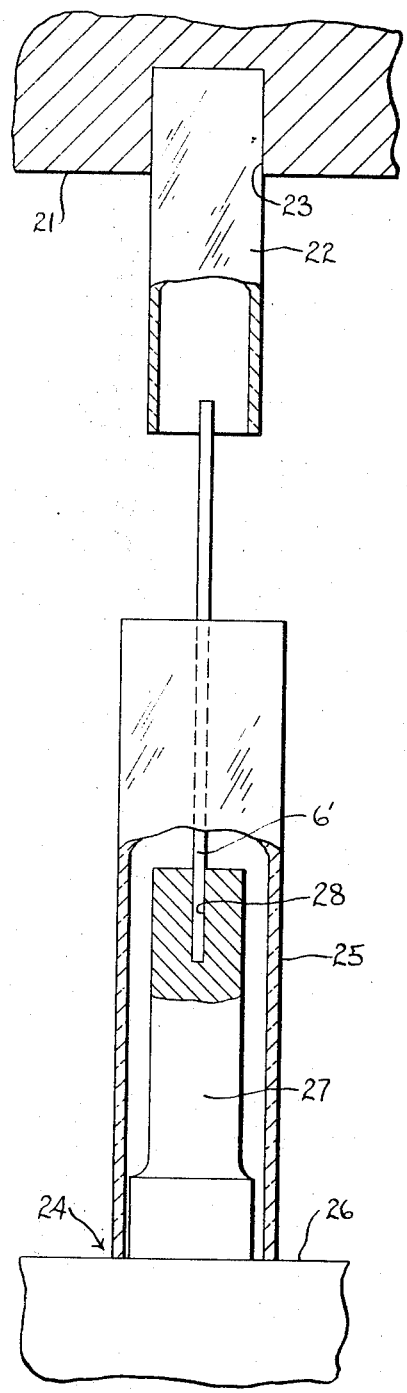
Figure 2:
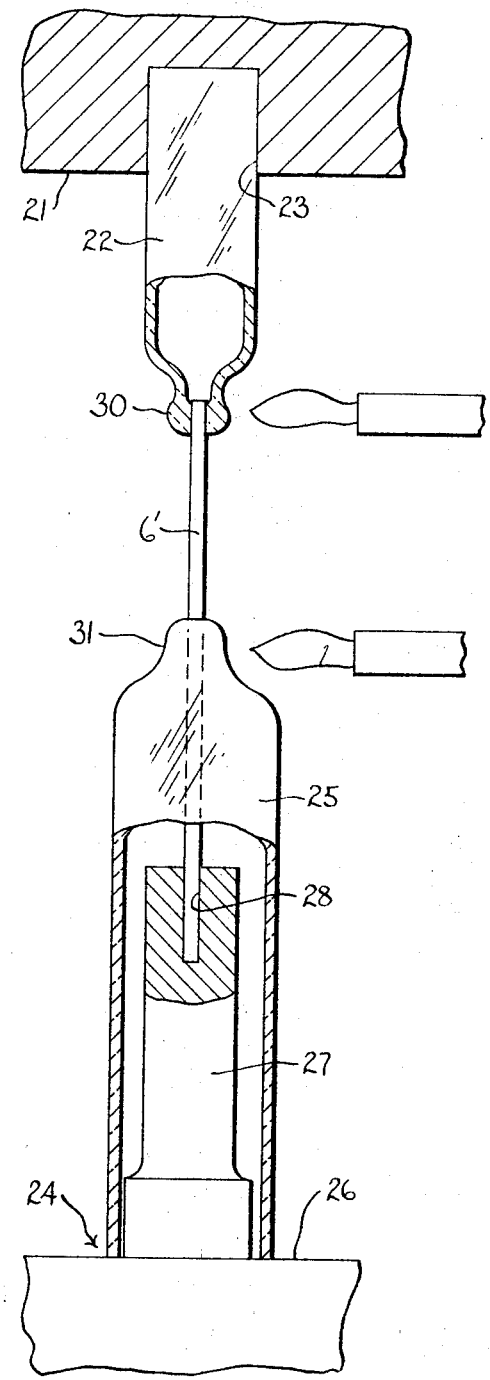
Figure 3:
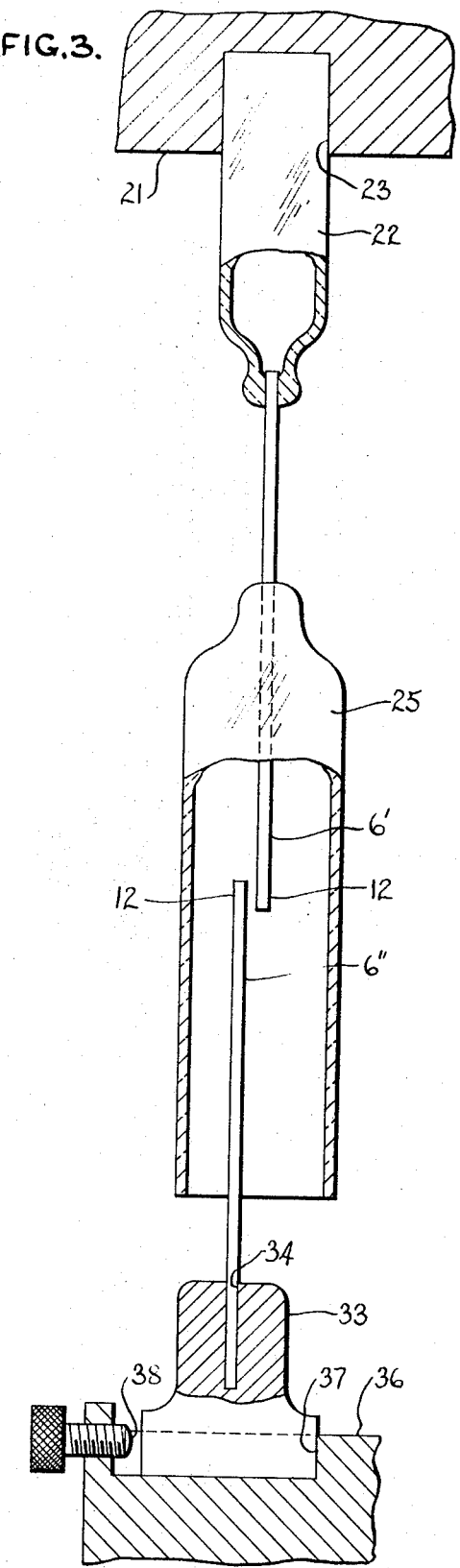

This application is a continuation-in-part of my application Ser. No. 533,695, filed Mar. 11, 1966, now abandoned, and embraces subject matter disclosed in my application Ser. No. 714,490, filed Mar. 20, 1968, now abandoned.

A dry reed switch, as is well known, comprises a pair of resilient, elongated, magnetically permeable reeds enclosed in an insulating carrier or envelope that is usually a sealed glass tube. The reeds extend in opposite directions in the tube and have flat tip portions in the tube that are slightly overlapped and are normally spaced apart by a small predetermined distance. The reeds, or extensions anchored to them, project axially beyond the sealed ends of the envelope to provide terminals for the switch to which conductors or the like can be connected. When the switch is subjected to a magnetic field, the overlapping inner tip portions of the reeds are attracted into circuit making engagement with one another, the reeds being flexed as their tip portions come together.

It is well known that closing and opening of a reed switch in precise response to magnetic fields of a predetermined intensity is dependent upon precise lateral spacing or gap between the overlapping flat tip portions of the reeds. Even a small variation in gap can significantly affect the performance of the switch because the attraction between the reed tips, under the influence of a magnetic field of given intensity, varies inversely with the square of the distance between them. The degree of precision to which the gap must be held can be appreciated from the fact that the gap in a typical reed switch may be on the order of .010 in.

Not only is it important that the reed gap be accurately established during assembly of a reed switch, and maintained in the finished switch, but in a switch wherein the tip surfaces of the reeds themselves provide the current carrying contacts, it is also important that the reeds be so oriented and disposed that their overlapping tip portions have true flatwise engagement with one another when they are attracted into contact. If one of the reeds is even slightly twisted or cocked relative to the other, the reeds will make only point contact, or at best line contact, rather than the surface-to-surface engagement that is desired. Point or line contact between the reeds is undesirable in such a switch because it produces a high resistance through the switch, encourages arcing whenever the switch opens, and promotes rapid deterioration of the contacting portions of the reeds.

In some types of reed switches wherein the reeds themselves do not provide both of the cooperating contacts, a line contact between the reeds may be tolerated, or even desired; but even in such cases point contact is undesirable and assurance must be had that the reeds in the finished switch will define a gap of exactly the desired magnitude and will be oriented in exactly the desired relationship to one another.

Heretofore many methods have been proposed for assembling or adjusting dry reed switches so as to achieve a reed gap of accurately predetermined size and insure true line or surface contact between the reeds when they are engaged. U.S. Pats. Nos. 2,406,008, 2,406,021, 2,577,-602, 2,648,167, 2,696,543, 2,855,017 and 3,284,876 exemplify methods previously devised for this purpose. But insofar as such prior methods may have attained one or both of the objectives just mentioned, they have been impractical because they required a high degree of skill and dexterity on the part of assembly personnel, entailed the use of complicated and expensive machinery, or made necessary some compromise with features that are desirable in a finished reed switch.

With the foregoing in mind, it is the general object of the present invention to provide a very simple, inexpensive and expeditious method of assembling the reeds and insulating envelope of a reed switch of the character described, whereby assurance is had that the reeds of the finished switch, when magnetically attracted into engagement with one another, will make exactly the desired type of contact—either flat surface-to-surface or true line contact; and that when the reeds are in relaxed (unmagnetized) condition there will be precisely a predetermined gap between their overlapped tip portions.

It is also a general object of this invention to provide a method of accurately assembling the elements of a reed switch, which method requires no compromise with desirable features of the switch produced thereby and lends itself to consistently precise high volume mass production with the use of relatively simple and inexpensive automatic machinery.

Another object of this invention is to provide a method of establishing the overlapping tip portions of a pair of reed elements for a reed switch in exactly a desired engagement with one another while one of the reed elements is firmly connected to a fixture member, and then, while the reed elements are maintained in exactly the positions in which they have such engagement, establishing a rigid connection between the other reed element and another fixture member, so that the desired gap between the reed elements can thereafter be established by controlled relative motion of one of the fixture members, and so that the reed elements can subsequently be maintained in exactly the relationship desired for them in the finished switch while their medial portions are being secured against relative motion by means of insulating supporting means such as a glass tube or envelope to which the reed elements are fused.

Another object of this invention is to utilize magnetism to establish a pair of reed elements for a dry reed switch in a first position in which they extend in opposite directions from overlapping tip portions and in which their tip portions mutually orient one another so that they have good, true contact of the type desired for them in the finished switch.

In connection with the object last stated it is another object of this invention to utilize certain properties of glass—namely its plasticity and cohesiveness when in the molten state, its ability to cool to hardness without internal stresses, and its rigidity when cool—to provide a rigid connection between one of a pair of reed elements and a member that is stationary with respect to the other reed element, by which connection the reed elements are maintained in the above mentioned first position when magnetization is terminated, so that subsequent controlled relative motion between the reed elements can be effected in such a manner that they always have a predetermined orientation with respect to one another.

Another object of this invention that is important to certain types of dry reed switches is to provide a method of assembling such switches wherein there is no need to hold or engage the carrier or envelope on or in which the reeds are mounted, so that in the case of an evacuated reed switch the tube that provides the envelope can be heated to substantial plasticity during the assembly operation, in order to degas it, without danger of its being deformed by its engagement with a holder.

In general, the objects of the present invention can be attained by securing one of the reed elements for a reed switch, by a tip portion thereof, to a temporary holder which is made of thermoplastic material, preferably of glass. The other reed element and said holder with the first reed element attached thereto are respectively secured to a pair of fixture members by which the reed elements are so supported that they extend in opposite directions from overlapping juxtaposed tip portions. While the reed elements are subjected to a magnetic field, the thermoplastic holder is heated to plasticity, allowing the first mentioned reed element to move, in response to magnetic attraction, to a position in which the overlapped tip portions of the two reed elements are engaged to mutually orient one another. The thermoplastic holder is then cooled to hardness while magnetization is maintained, after which magnetization is discontinued. Thereafter one of the reed elements is moved relative to the other to establish the desired gap between the overlapping tip portions of the two reed elements, thus disposing the reed elements in a final position in which their medial portions can be secured against relative motion by means of an insulating carrier such as a glass envelope to which they are fused.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

Figure 4:
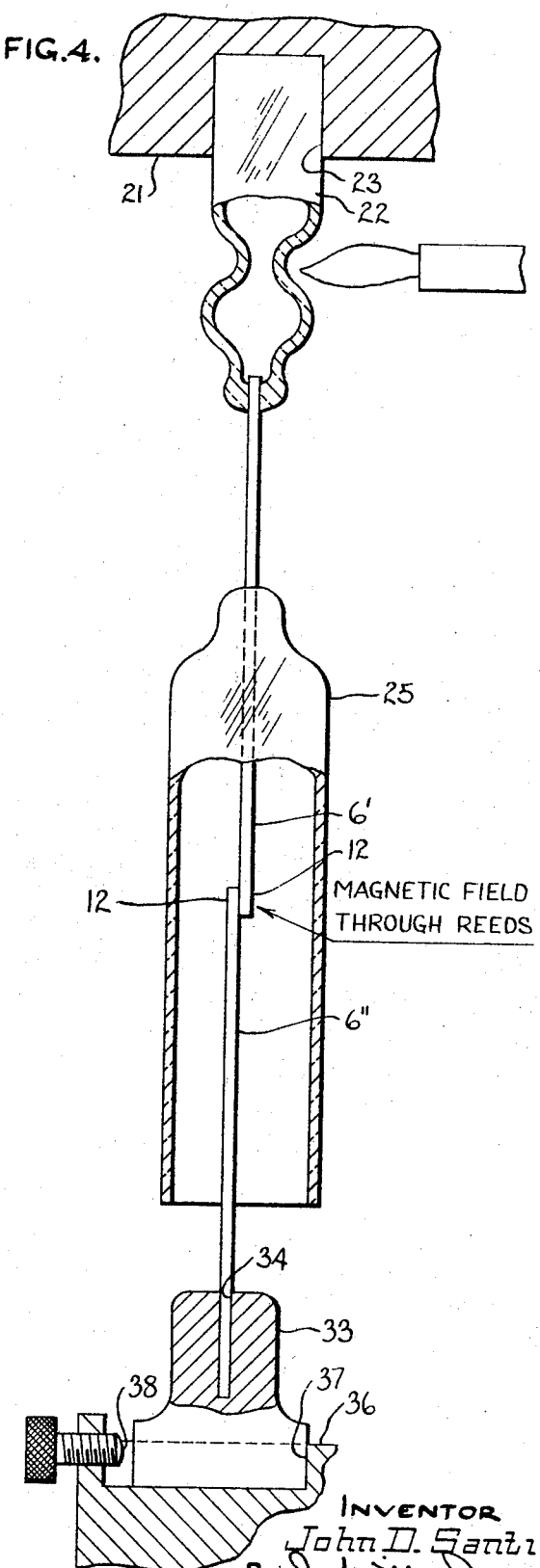
Figure 8:
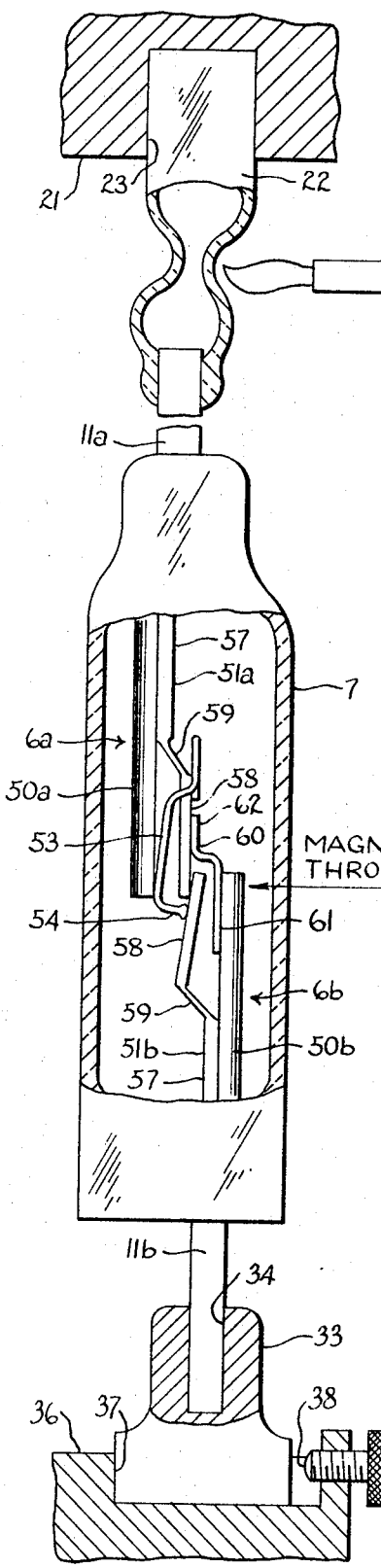

The accompanying drawings illustrate one complete example of the practice of the invention according to the best mode so far devised for the practical application of the principles thereof, and in which:

FIGS. 1 through 6 are more or less diagrammatic views, mainly in elevation but partly in vertical section, showing successive steps in the assembly, in accordance with the method of this invention, of a reed switch wherein the overlapping tips of the reeds themselves provide the current carrying contacts;

FIG. 7 is a perspective view showing a completed reed switch that has been assembled in accordance with this invention, in detached relation to a thermoplastic holder used in the assembly method; and FIG. 8 is a view generally corresponding to FIG. 4 but illustrating the method of this invention applied to the assembly of a reed switch having a contactor that is carried by one of the reeds for limited motion relative thereto, and wherein the reeds themselves are intended to make only line contact upon switch closure.

Referring now to the accompanying drawings, the numeral 5 (see FIG. 7) designates generally a reed switch of one type with which this invention is concerned, and which comprises, in general, a pair of elongated reed elements 6, and an insulating supporting means or carrier 7 comprising a sealed envelope of glass or the like. Each of the reed elements 6 comprises a magnetically premeable, resiliently flexible reed proper, designated by 8, which is located entirely within the envelope, and a stem portion 9 which extends through a seal 10 at the end of the envelope and projects therebeyond to provide a terminal 11 for the switch. As shown, the stem portion 9 of each reed element 6 is integral with its reed portion 8, but the stem could of course comprise a more rigid member to which the reed is welded or otherwise affixed.

The reeds 8 have overlapping inner tip portions 12 which are opposed to one another and which are normally spaced apart by a predetermined distance so that there is a gap 13 between them. Each of the reeds has a flat surface on at least its tip portion 12 that opposes the corresponding flat surface on the other reed. In this case, as in many reed switches, such flat surfaces are provided by reason of the fact that each of the reeds is of uniform rectangular cross section all along its length.

The envelope 7 serves both as a protective housing and as an insulating carrier for the reeds, being secured to the medial portions of the reed elements. When the envelope 7 is formed from a glass tube, as is most often the case, its end portions are usually fused around the medial portions of the reed elements to maintain the reeds in the above described normal relationship to one another and also to provide the seals 10 by which the reeds are maintained in a desired environment such as vacuum, inert gas or the like.

For the efficient practice of the method of this invention it is desirable that there be provided a fixture comprising an upper fixture member 21. Since details of the fixture will be readily apparent to those skilled in the art, and are in any event capable of substantial variation, it is shown rather diagrammatically in the accompanying drawings.

The upper fixture member 21 provides a mounting for an elongated thermoplastic temporary holder 22, and for this purpose it can have a downwardly opening well 23, in which the thermoplastic holder is received with a substantially snug fit and by which the holder is secured in an upright position, projecting downwardly from the upper fixture member. The preferred material for the thermoplastic temporary holder 22 is glass tubing inasmuch as it is essential that the holder be capable of localized plasticization under the influence of heat and be capable of cooling to hardness without acquiring internal stresses.

For the first step of the method (see FIG. 1) there is temporarily established in fixed relation to the upper fixture member 21 a locating member 24 which serves to support a reed element 6' and a glass tube 25 or the like that is to become the insulating carrier or envelope 7 of the finished switch. The locating member 24 has an upwardly facing surface 26 upon which the lower end of the glass tube 25 rests, and has a pilot portion 27 which projects upwardly from said surface 26 and around which the glass tube 25 fits with a small clearance to be thereby held substantially coaxial with the thermoplastic holder 22. For supporting the reed element 6' in substantially coaxial relation to the thermoplastic holder 22 and the glass tube 25 the pilot portion 27 can have a downwardly opening coaxial well 28 therein in which the lower end portion of the reed element is receivable with a sufficiently close fit to hold it steady but not so snugly as to require the exertion of substantial force for insertion or withdrawal of the reed element. Note that the reed element 6' and the glass tube 25 are held in such relation to one another and to the thermoplastic temporary holder 22 that the lower end of the reed element is about midway between the ends of the tube 25, the upper end portion of the reed element projects a small distance into the thermoplastic holder, and the glass tube 25 is spaced a distance below the thermoplastic holder.

With the parts maintained in the relationship just described, the lower end portion of the thermoplastic temporary holder 22 is heated to plasticity (see FIG. 2) to fuse it around the upper end portion of the reed element 6', thereby establishing a connection 30 between the thermoplastic holder and the reed element. Substantially concurrently, the upper end portion of the glass tube or envelope 25 is heated to plasticity to fuse it, as at 31, around the medial portion of the reed element 6', thereby establishing the securement of said reed element to the envelope and sealing the upper end of the envelope.

After these fusing operations are completed and the temporary holder 22 and tube 25 have cooled to hardness, the locating member 24 can be replaced by a lower fixture member 33 (see FIG. 3) which supports a second reed element 6" in an upright position. It will be observed that after removal of the locating member 24, the reed element 6' (which is hereinafter designated the upper reed element) is supported by the thermoplastic holder 22, and the envelope tube 25 is in turn supported by the upper reed element.

The lower fixture member 33 is so arranged that it can be maintained stationary with respect to the upper fixture member 21 or can be shifted along a defined path between defined limits. The reed element 6" (hereinafter designated the lower reed element) has its bottom end portion so secured to the lower fixture member as to be held thereby in an upright position in which the upper tip portion of the lower reed element is in overlapping relation to the lower tip portion of the upper reed element and said tip portions are in approximate flatwise opposition. For so mounting the lower reed element the lower fixture member 33 can be provided with an upwardly opening well 34 in which the lower end portion of said reed element is receivable with a close enough fit to be held steady but not so snugly as to require substantial force for insertion or withdrawal of the reed element.

The well 34 in the lower fixture member and the well 28 in the pilot portion 27 are so shaped that the reed elements are oriented with their wider faces generally transverse to the path of motion of the lower fixture member, but for reasons which will appear presently, no special effort need be made up to this point in the process to establish the reed elements with their opposing flat surfaces in accurate parallelism.

With the two reed elements held as just described, a magnetic flux is caused to thread them so that their overlapping tip portions tend to be drawn into flatwise engagement. While such magnetization is continued (see FIG. 4) heat is applied to that portion of the thermoplastic holder 22 which is intermediate the upper fixture member 21 and the connection 30 of the temporary holder with the upper reed element 6', and such heating is continued until said portion of the thermoplastic holder is plasticized to substantial fluidity. The upper reed element 6' is thereby freed to move under the influence of magnetic attraction to the position in which its lower tip portion is firmly flatwise engaged with the upper time portion of the lower reed element 6". The thermoplastic holder can then be cooled to hardness while the magnetic field through the reed elements is maintained to hold the upper reed element in the position just described.

When the thermoplastic temporary holder has cooled, magnetization can be terminated. At that time the thermoplastic holder of course provides a rigid connection between the upper reed element 6' and the upper fixture member 21, and the reed elements are established by the fixture members 21 and 33 in a known orientation with respect to one another such that their overlapping tip portions are in true surface-to-surface engagement; hence the reed elements can be brought accurately to any other desired relationship by controlled motion of either fixture member 21 or 33 relative to the other.

Thus, to establish the gap between the overlapping tip portions of the reed elements it is only necessary to translate one of the fixture members 21 or 33 in a direction normal to the opposing flat surfaces of the reed elements and through a distance corresponding to the desired gap. As illustrated in FIG. 5, the lower fixture member 33 can be mounted on a suitable carrier 36 which is suitably connected in fixed relation to the upper fixture member 21 and by which the lower fixture member is confined to sliding motion between limits defined by a pair of stop abutments 37 and 38. It will be understood that these stop abutments are spaced apart by such a distance that the travel of the lower fixture member 33 from one to the other of them is equal to the desired reed gap. To facilitate accurate predetermination of the reed gap, the stop abutment 38 can comprise, as illustrated, a manually adjustable screw.

From the time the lower reed element is first brought into tip-to-tip juxtaposition to the upper reed element (FIG. 3) until magnetization of the reed elements is terminated (FIG. 5), the lower fixture member 33 of course remains engaged with the stop abutment 37. Thereafter however, as illustrated in FIG. 6, the lower fixture member is shifted along the carrier 36 in the direction to effect lateral separation of the overlapping tip portions of the reed elements and until it engages the stop abutment 38. This establishes the reed elements in the relative positions and orientations desired for them in the assembled switch.

With the lower fixture member 33 immobilized against the stop element 38, the lower end portion of the envelope tube 7 is heated to plasticity, to fuse it around the medial portion of the lower reed element, as at 40. This of course secures the reed elements in the desired relationship to one another as well as sealing the envelope, so that when the envelope has subsequently cooled to hardness the assembly can be removed from the upper and lower fixture members.

As a final step in the process the outer portion of the upper reed element 6' can be cut through, with a suitable cutter 41, near the thermoplastic temporary holder, and the latter can be discarded.

In the switch illustrated in FIG. 8 each of the reed elements 6a and 6b has several components, and the reeds proper are intended to make line contact upon switch closure, but the method of assembling the reed elements with the insulating supporting means or carrier 7 is in all respects identical to that described above.

Specifically, each of the reed elements 6a and 6b comprises a terminal portion 11a, 11b, respectively, which, in the finished switch, extends inwardly a short distance through a sealed end portion of the envelope and projects outwardly beyond it, a resiliently flexible rebound post 50a, 50b, which is anchored (as by welding) to the inner end of the terminal portion and projects inwardly therefrom, and a reed member 51a, 51b, which is also anchored to the terminal member and which extends lengthwise along the rebound post.

Each rebound post 50a, 50b is substantially stiffer than its reed member and extends along its reed member at the rear side thereof, that is, at the side of the reed member that is remote from the other reed member. Each reed member has an axially outermost anchor portion 57 which extends flatwise along the front face of its rebound post and can be secured thereto, an armature portion 58 comprising its free inner end, and a medial reduced thickness neck portion 59 at which its flexing takes place. The armature portion 58 is resiliently biased toward its rebound post so that at least the free tip portion thereof normally bears against the rebound post under rearward bias, for reasons explained in U.S. Pat. No. 3,315,193 to J. D. Santi.

The opposing tip portions of the reed members are arranged in the usual overlapping relationship, but in this case they are not the contacts that make and break the circuit through the switch, although during such time as the switch is fully closed they are engaged with one another to define one of a pair of current paths through the switch. The other and main current path is provided by a light resilient contactor 53 which is carried by the reed member 51a and which engages the tip portion of the reed member 51b at a zone thereof which is slightly spaced from the zone of its engagement by reed member 51a. For full details concerning the contactor 53, reference can be made to the copending application of J. D. Santi, Ser. No. 714,490, filed Mar. 20, 1968.

The contactor 53 is secured to the rear surface of the armature portion 58 of the reed member 51a, as by spot welding, and extends along the same, being resiliently biased forwardly relative to it so as to normally bear against it with some forward force. A contact portion 54 of the contactor 53 projects forwardly across the tip of the reed member 51a to be normally spaced from the reed member 51b by a distance less than the normal spacing between the reed members.

When the reed members are magnetically attracted toward one another, the contactor 53 engages the reed member 51b before the reed members themselves come into contact. When the magnetic actuating field is removed or decays, the reed members spring apart, but the contactor 53 remains in contact with the reed member 51b for a brief instant after separation of the reed members themselves. During that short interval, the contactor, because of its flexing bias, reacts between the reed members to supplement their own flexing forces, accelerating them rapidly apart until the reed member 51a collides with the contactor 53 and forcefully knocks its contact portion 54 out of engagement with the reed member 51b, overcoming any tendency toward contact sticking.

The switch illustrated in FIG. 8 can be assembled in such a manner that when it is fully closed its reed members make flatwise surface-to-surface engagement, or alternatively it can be assembled to insure that they will make line contact, as shown. Flatwise contact insures that the switch will have minimum contact resistance when closed; line contact may be desirable under certain circumstances, as for minimizing make bounce.

To provide for the desired type of contact between the reed members at switch closure, a locating member 60 is secured to the rebound post 50b of the reed element 6b. The locating member 60 performs no function in the finished switch, but it is needed for assembling the switch in accordance with the method of the present invention.

The locating member can be of any suitable material, but is preferably formed of a round, fairly stiff wire. It has generally a Z-shape, with an anchor portion 61 which is flatwise secured, as by welding, to the front face of the rebound post 60b, and a forwardly offset straight tip portion 62.

It is important that the tip portion of the locating member be narrow (thin) enough so that it makes little more than a line contact along its length with the front surface of the armature portion of the reed member 51a, so that the latter is free for transverse rocking motion on the locating member by which said reed member can cooperate with its opposing surface on the other reed member 51b in establishing itself in a true line contact or a true surface-to-surface engagement therewith during magnetic connection of the reed elements through the assembly step represented by FIG. 8.

It is also important that the tip portion 62 of the locating member have sufficient length so that the substantially line contact which it makes with the reed member 51a will stabilize the latter in lengthwise line engagement with the tip portion 62 during such magnetic connection.

The orientation of the tip portion 62 of the locating member determines the type of contact the reed members will make with one another. To establish its proper orientation, the reed members are assumed to be flexed into the desired engagement for magnetic connection, and the locating member is then designed so that its tip portion 62 will have line contact along its length with the front surface of the armature portion of the reed member 51a.

It will be evident that the distance by which the tip portion 62 of the locating member is forwardly offset from its anchor portion 61 determines the amount by which the reed member 51b is flexed away from its rebound post 50b during magnetic connection. The amount by which the reed member 51a is flexed away from its rebound post 50a during magnetic connection depends upon the amount of forward projection of the contact portion 54 of the contactor 53.

The locating member 60 has engagement with the reed member 51a only during the assembly procedure, when it participates in the mutual orientation of the reed elements 6a and 6b. With the step of translation of one reed element relative to the other, following hardening of the temporary holder 22, there is established a spacing between the reed member 51a and the locating member such that the two cannot again come into contact.

It will be evident that the method of this invention lends itself as well to assembly of the sophisticated switch shown in FIG. 8 as it does to assembly of the simple type of reed switch illustrated in FIGS. 1–7, the assembly procedure being exactly the same in both cases.

From the foregoing description taken together with the accompanying drawings it will be apparent that this invention provides a simple and expeditious method of so assembling a pair of reed elements and an insulating carrier into a dry reed switch that the reed elements are established in such positions and orientations that their overlapping tip portions will normally have a gap of predetermined size between them and when magnetically flexed into contact will have true engagement of the desired type, either flatwise surface-to-surface or line contact.

What is claimed as my invention is:

1. The method of making a reed switch having a pair of magnetically permeable elements, one of which comprises a reed, and which elements are in a predetermined relationship with one another such that they extend in opposite directions and have overlapping inner flat tip portions that are normally spaced apart laterally by a predetermined gap and are engageable with predetermined type of contct under magnetic attraction, which method is characterized by:
   (A) securing the outer end portion of one of the elements to a thermoplastic temporary holder;
   (B) securing said thermoplastic holder and the outer end portion of a second element respectively to a pair of fixture members by which the two elements are so supported that they extend in opposite directions and have their inner tip portions overlappingly juxtaposed;
   (C) while causing magnetic flux to thread the elements, heating the thermoplastic holder to sufficient plasticity to allow the first element to be moved by magnetic attraction to a position in which the overlapping inner tip portions of the elements are engaged to mutually orient one another;
   (D) cooling the thermoplastic holder while maintaining magnetic flux through the elements;
   (E) discontinuing such magnetization of the elements when the thermoplastic holder has cooled to hardness;
   (F) effecting relative motion between said fixture members to flatwise separate the tip portions of the elements a distance equal to said predetermined gap; and
   (G) while confining the fixture members against further relative motion, and without disturbing the disposition of the elements, securing the medial portions of the elements against relative motion by means of insulating supporting means.

2. The method of assembling a dry reed switch of the type comprising a pair of oppositely extending, magnetically permeable elements, one of which comprises a reed, which elements have overlapping flat inner tip portions between which there is a gap of predetermined size, and a glass tube that encloses all but outer end portions of the elements and has its end portions sealed around them, which method comprises:
   (A) sealing one end portion of a glass tube around the medial portion of a first element with the glass tube extending a substantial distance beyond the inner tip of said element;
   (B) securing a glass temporary holder to the outer end portion of the first element;
   (C) mounting the temporary holder on a fixture member by which the first element is held upright with its inner tip lowermost;
   (D) securing an end portion of a second element to a second fixture member which disposes said second element upright, partway in the tube, and with its inner tip portion overlappingly juxtaposed to the inner tip portion of the first element;
   (E) while causing a magnetic flux to thread the elements, heating the temporary holder to such plasticity that the first element can move under magnetic attraction to a position in which the overlapping inner tip portions of the elements are engaged to mutually orient one another;
   (F) cooling the temporary holder while maintaining magnetic flux through the elements;
   (G) discontinuing such magnetization of the elements when the temporary holder has cooled to hardness;
   (H) effecting relative motion between said fixture members to flatwise separate the inner tip portions of the elements a distance equal to said gap, and thereby establishing the elements in final positions; and
   (I) while maintaining the elements in said final positions, sealing the other end portion of the glass tube around the medial portion of the second element.

3. The method of claim 2, further characterized by the step of:
   cutting through the first element intermediate the glass tube and the temporary holder after said end portion of the glass tube is sealed.

4. In the assembly of a dry reed switch comprising an insulating carrier and a pair of magnetically permeable elements, one of which comprises a reed and both of which are connected with the carrier and have inner tip portions and outer portions that project beyond the connections of the elements with the carrier, the following characterizing steps performed before the two elements are both connected with the carrier:
   (A) holding one of the elements in a predetermined position by engaging it with fixable holding means at a distance from its inner tip portion;
   (B) by means of magnetic flux threading the two elements, magnetically attaching the other element to the held element and solely supporting it thereby with its inner tip portion overlapping and engaging that of said held element and with the elements extending in opposite directions from their attached tip portions and mutually orienting one another;
   (C) while the magnetic flux through the elements is being maintained, heat forming a temporary holder body of heat plasticized thermoplastic material which is other than said insulating carrier and which is
      (1) in contact with the outer portion of said other element and
      (2) also in contact with a rigid supporting member that is stationary with respect to the fixable holding means, the plasticity of said temporary holder body permitting the elements unconstrainedly to maintain themselves with mutually orienting engagement of their overlapping tip portions; and
   (D) while still maintaining magnetic flux through the elements to support said other element, cooling said temporary holder to establish a rigid connection between said other element and said rigid supporting member so that the elements remain in relative orientations which can always be known during subsequent controlled relative motion between said rigid supporting member and the fixable holding means to establish a gap between the overlapped tip portions.

5. In the assembly of a dry reed switch comprising an insulating carrier and a pair of magnetically permeable elements, one of which comprises a reed and both of which are connected with the carrier and have overlapping tip portions and outer portions that project beyond the connections of the elements with the carrier, the following characterizing steps performed before the two elements are both connected with the carrier:
   (A) confining one of the elements in a predetermined position by engaging it with fixable holding means at a distance from its inner tip portion;
   (B) by the application of localized force to the tip portions of the two elements establishing and maintaining said tip portions in firm mutually orienting engagement and thereby supporting the other element solely from the held element with its tip portion overlapping that of the held element and with the elements extending in opposite directions from their engaged tip portions;
   (C) with the elements so engaged forming a body of plastic hardenable material
      (1) in contact with the outer portion of said other element and
      (2) also in contact with a rigid member that is stationary with respect to the fixable holding means;
      (3) said body of material being other than said insulating carrier and
         the plasticity of said body permitting unconstrained maintenance by the elements of the mutually orienting engagement of their overlapping tip portions;
   (D) hardening said body of plastic material to establish a rigid connection between said other element and said rigid supporting member; and
   (E) thereafter terminating said application of localized force to said tip portions of the elements so that a predetermined gap can be established between said overlapped tip portions by effecting controlled relative movement between said rigid supporting member and said fixable holding means.

References Cited
UNITED STATES PATENTS

| | | | |
|---|---|---|---|
| 3,284,876 | 11/1966 | Buttel | 29—622 |
| 3,369,291 | 2/1968 | Schaffer Jr. et al. | 29—622 |
| 3,432,282 | 3/1969 | Schultz | 29—622UX |

JOHN F. CAMPBELL, Primary Examiner

R. W. CHURCH, Assistant Examiner

U.S. Cl. X.R.

29—423, 628; 65—155